Feb. 2, 1960

R. G. RIESER 2,923,591

DYEING PLASTIC SHEETING

Filed Jan. 4, 1954

INVENTOR.
RAYMOND G. RIESER

BY Oscar L. Spencer
ATTORNEY

2,923,591
DYEING PLASTIC SHEETING

Raymond G. Rieser, New Kensington, Pa., assignor to Pittsburgh Plate Glass Company, Allegheny County, Pa., a corporation of Pennsylvania Application January 4, 1954, Serial No. 401,980

9 Claims. (Cl. 8—4)

The present invention relates to a novel method of dyeing plastic sheeting and relates particularly to various improvements in the handling and treating of the plastic sheets suitable for use as an interlayer in laminated safety glass wherein the transmission coefficient of the laminated assembly is regulated by the amount of dye imparted to the sheet.

According to the methods previously practiced, a plastic sheet is adhered to a frame, then dipped into a dye bath, then removed from the dye and immediately rinsed to stop the dyeing action and remove the excess dye, subsequently rinsed again or soaked with distilled water, air dried by blowing air past the plastic sheet surfaces and subsequently dried in a kiln. In dyeing plastic sheets using prior methods, a considerable proportion of the dyed plastic sheets had to be rejected because of blemishes resulting from streaking and spotting of the applied dyes in intensities greater or less than those desired for a particular portion of the surface area of the plastic sheet being dyed.

Using previous methods, vertical streaks of alternate heavy and light density stain developed while the sheet was immersed in the dye bath. I have related this source of defect to a non-uniformity in tension of the plastic sheet during immersion thereof in the dye. Rejects caused by this type of defect have been minimized by requiring operators to tension the plastic sheet prior to immersion in the dye. My novel method includes the provision for stretching the plastic sheets uniformly both in length and in width prior to adhering them to a carrying frame on which they are mounted during the dipping operation.

My novel process also minimizes the appearance of spots on the dyed plastic sheet due to the incorporation of dust and undissolved particles of dye from the surface of the dye solution onto the surface of the plastic sheet. I have overcome this drawback by skimming the surface of the dye bath immediately prior to dipping the plastic into the solution. Skimming removes undesired particles from the surface of the dye bath.

Another improvement in the method of dyeing plastic sheets which is incorporated in my present invention is the utilization of a novel dye solution including a new stabilizing material. The use of this new dye stabilizer eliminates the necessity of a second rinse or a soaking of the dyed plastic sheet in lieu of the second rinse. Therefore, less time and less space is now required for the dyeing operation than heretofore.

There is very little leeway between the minimum transmission requirements for laminated safety glass and the maximum transmission acceptable to automobile manufacturers and the like who utilize laminated safety glass assemblies in their products. Hence, it is necessary that the laminates produced have a transmissivity that is within these close tolerances to minimize the number of rejects. It has been found that more efficient temperature control of the chamber in which the dye bath is maintained results in the production of a higher percentage of acceptably dyed plastic sheets than heretofore.

Accordingly, it is an object of the present invention to provide an improved method for imparting a dye to sheets of vinyl plastic.

Referring to the drawings.

Figure 1:
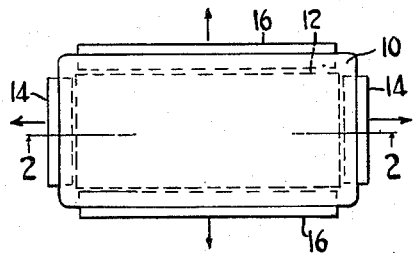
Figure 1 represents a plan view showing the first step in the operation of dyeing a vinyl plastic sheet.
Figure 2:
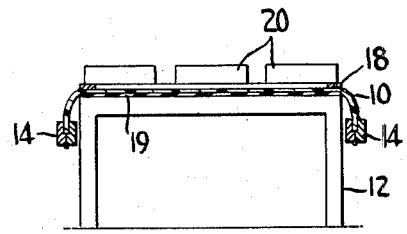
Figure 2 is a cross-sectional view along the lines 2—2 of Figure 1 showing a subsequent step in the preliminary treatment of the plastic sheet prior to dipping.

Referring to the drawings, Figure 1 discloses the first step of preparing a plastic sheet 10 for dyeing. The sheet 10 is placed upon a table 12 having dimensions slightly smaller than those of the sheet. A pair of tensioning clamps 14 are attached along the opposing lengthwise edges of the sheet and an additional pair of tensioning clamps 16 are attached along the opposing side edges of the sheet. By means of these sets of clamps, the sheet is tensioned uniformly in both length and width so that it lies smoothly against the top of the table. Sufficient tension to provide a stretch of between 6% and 8% is preferred.

Next, a plastic solvent is applied to a frame 18 and the frame is laid atop the tensioned plastic sheet. This plastic solvent may be any material having the characteristics of dissolving polyvinyl butyral, of low viscosity, and non-reactive with the metal comprising the frame, may be used. A suitable solvent is n-butyl Cellosolve, otherwise known as ethylene glycol monobutyl ether, $C_4H_9OCH_2CH_2OH$.

It is desirable that the frame be applied to the plastic immediately after application of the plastic solvent upon the surface of the frame and that the surface so treated be facing the upper surface of the stretched plastic atop the stretching table. As the plastic is dissolved by the plastic solvent, the plastic sheet adheres to the framing member 18. It has been found that the plastic sheeting can be cemented to the frame by applying an average pressure of one pound per linear inch for approximately 1½ to 2 minutes within a temperature range from 72 to 78° F. This may be accomplished by applying weights 20 uniformly about the periphery of the frame.

The stretched plastic sheet must be cemented to the metal dipping frame in such a manner as to produce a tight bond without air pockets. Air pockets between the frame and the plastic produce streaks if the air in the pockets is released during the dipping process. Moreover, poor adhesion of the plastic to the frame results in pull off and in most instances causes rejection of the sheet.

In applying the butyl Cellosolve solvent, care must be exercised to minimize or eliminate a bead of solvent along the edges of the frame. Also the frames must be cleaned before the solvent can be applied. Better contact between the plastic sheeting and the frame is obtained when a thin layer 19 of felt cloth or sponge rubber approximately ⅛ inch thick covers the top of the table 12.

The tensioning clamps 14 and 16 are removed from the plastic when the adhesion of the tensioned sheet to the frame is completed. The excess plastic is then trimmed from around the outer periphery of the frame by cutting. Trimming of the excess plastic must be accomplished without pulling the plastic from the frame.

The sides of the frame 18 are provided with a pair of aligned doughnut like portions or ears 22 at the top side and another pair of ears 23 at the bottom side extending from the periphery of the frame 18. By aligning a plurality of frames 18 and inserting rods 24 through the aligned ears, a number of plastic sheets preliminarily treated as described above may be simultaneously dyed, rinsed, dried and stacked for lamination.

A plurality of frames, each holding a plastic sheet, is conveyed by a carriage 21 on overhead tracks 25. The support rods 24 are attached to a plate 26 connected to a vertical slide rod 27 by means of a connecting member 28. The latter is suitably balanced by a counterweight 29 by a chain and pulley arrangement. Slide rod 27 is slidable vertically past a series of bearing rolls 30 mounted in a bracket 31 fixed to the carriage 21.

Raising and lowering the frames 18 is accomplished by vertical movement of the slide rod 27. A constant speed motor 32 drives a variable speed unit 33, which, in turn is coupled to a reducer 34. The last three named units are mounted on the carriage. A sprocket and chain drive connects a main shaft 35 to the reducer.

To one end of the main shaft is fixed a rotatable lifting lever arm 36. A chain 37 connects the end of the lever arm to connecting member 28. Guide rollers 38 are provided to insure that the lower end of chain 37 is always oriented vertically. The other end of shaft 35 carries a disc or cam 40, against the periphery of which is biased a link-type cam follower 41 pivoted at its other end to a fixed pivot pin 42. A linkage 43 pivoted to the cam follower 41 at one end is connected to an adjustment lever of the variable speed unit 33.

As this group of frames is conveyed over a tub 50 containing the dye solution, the conveyor is stopped and the assembly of frames is lowered into the dye solution by lowering the slide rod 27. The duration of dwell of each horizontal section of the plastic sheeting in the dye bath is determined by the shape of the cam 40.

The rate of vertical displacement of the plastic sheets within the dye bath may be constant or non-uniform depending upon the degree of stain and the configuration of staining that is desired. The proportion of plastic sheet immersed within the dye solution and the duration of exposure of the sheet to the dye are factors determining the dye pattern.

Immediately prior to lowering the plastic sheets into the bath, the upper surface of the dye solution is cleaned of dust and small particles of dye by skimming with a paper towel or napkin 52. It has been found that dust on the upper surface of the dye solution causes spots on the surface of the plastic, and undesired portions of dye which float on the surface of the dye bath result in considerable staining of the plastic surface. This skimming action immediately prior to the dipping of the sheet within the dye bath eliminates the occurrence of these inhomogeneities in the surface of the dyed plastic.

Before immersing the plastic sheets in the dye, care must be taken to insure that the sheets are separated and that no bubbles are formed upon immersing the plastic. This precaution is required because the dye cannot darken those portions of the plastic sheet surfaces that are not exposed to the bath either because of the presence of air bubbles or because the surface of one plastic sheet is partly covered by its adjacent sheet.

The surface of the dye bath must be protected from air currents either by using baffles 58 around the top of the dye tank or use of a tank of sufficient capacity to have a minimum of 10 inches of tank wall extending vertically above the dye solution to avoid air movement across the dye surface that causes dye precipitation. The solubility of dye at the surface is decreased by evaporation of the more volatile dye solution ingredients leaving a high water concentration in the surface layer. This separated dye tends to collect on the plastic sheet usually in the form of a grainy heavy dye deposit without any definite pattern. This condition is usually limited only to the outer surfaces of the outside sheets of a stack immersed in the dye bath, since these sheets act as baffles for the other intermediate sheets being stained.

The baffles 58 which are coupled to the tub 50 by hinges 60 are required for two purposes: to protect the surface of the dye solution from random localized movement of air thereby causing localized evaporation of the solvent which results in localized spotting due to the formation of small particles of dye, and to prevent the introduction of dust particles from the air onto the upper surface of the dye solution, thus minimizing the danger that imperfections on the surface of the dye bath will be imparted to the surface of the plastic sheet during immersion or removal of the latter relative to the dye solution.

The following range of dye solution compositions provides a desired shade: 98.5 to 99% by weight of a dioxane-water mixture (50–50 volume ratio), 0.1 to 1.5% by weight of morpholine stabilizer, 0.10 to 0.20% by weight of a suitable wetting agent such as a mixture of non-ionic polyoxyethylene esters of mixed fatty and resin acids and approximately 0.25% by weight of suitable dyestuffs. A suitable dyestuff mixture consists of 18% by weight of a pink dye which is 1-amino-4-hydroxyanthraquinone, identified in Colour Index, 2d edition (published in 1956 by Society of Dyers and Colourists, published at Yorkshire, England), at page 3491, as C.I. Disperse Red 15, Colour Index No. 60710, 37% by weight of a blue unsulfonated anthraquinone type dye, e.g., 1-4-di(aliphatically monosubstituted amino)-anthraquinone and 45% by weight of a yellow dye which is the azo coupling product of diazotized para-aminoacetanilide with para-cresol. With regard to the blue 1,4-di(aliphatically monosubstituted amino)-anthraquinone, the term "aliphatic" is used in the sense of open-chain carbon compound. Dioxane is otherwise known as diethylene dioxide, $C_4H_8O_2$, and morpholine as diethylenimide oxide, $C_4H_9ON$.

The dioxane solution used as a solvent in the dye bath must be stabilized to prevent the formation of peroxides which cause decomposition of the dyestuffs in the bath. Previously, plastic sheeting was dip stained in dye baths containing diethyl aminoethanol as a stabilizer. Plastic sheeting dyed in baths containing this stabilizer is characterized by a variation in light stability from sheet to sheet. I have correlated this lack of uniformity in color imparted to different sheets to the presence of diethyl aminoethanol.

I have discovered that by substituting morpholine for diethylaminoethanol, the uniformity of staining of plastic sheeting is enhanced considerably. Morpholine is effective as a stabilizer in concentrations of from 0.1% to 1.5% by weight of the solution. About 1% by weight of morpholine is the optimum concentration.

Immediately after removal from the dye bath in tub 50, the sheets are rinsed with water from water spray apparatus 62. This rinsing washes off the excess dye still on the plastic sheet surfaces and stops any further dyeing action.

Figure 3:
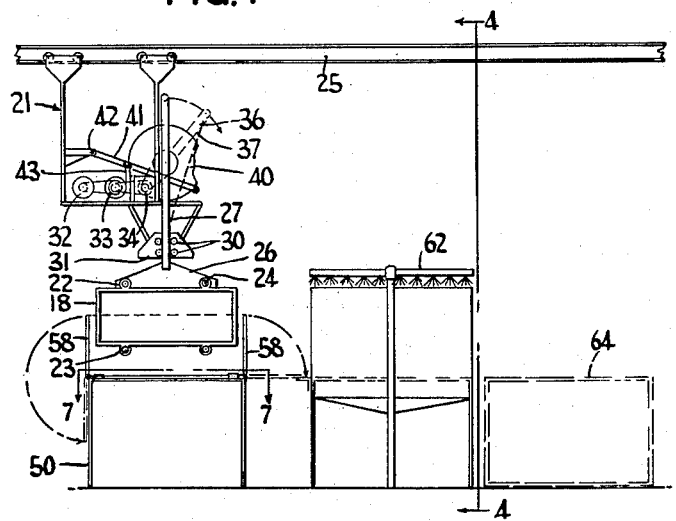
Figure 3 represents a side view of a portion of a typical apparatus by which plastic sheets are dyed and rinsed, and includes in dashed lines a section required in prior processes, but which may be dispensed with when my invention is utilized.
Figure 4:
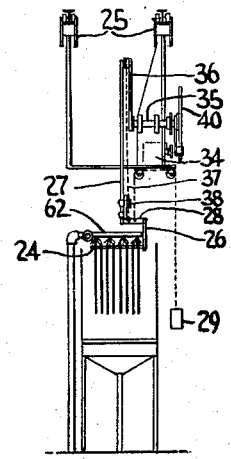
Figure 4 is an end view taken along the line 4—4 of Figure 3.
Figure 6:
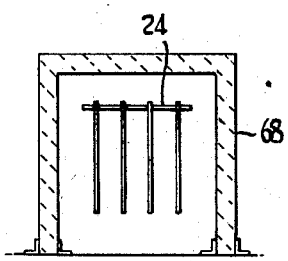
Figure 6 is a cross-sectional view of part of a drying kiln for subsequently drying the plastic sheet after they have been air dried.
Figure 5:
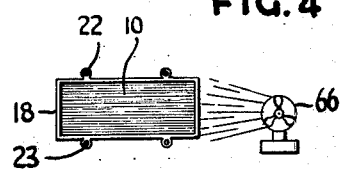
Figure 5 is a schematic view of the air drying operation accomplished subsequently to the dyeing and rinsing.
Figure 7:
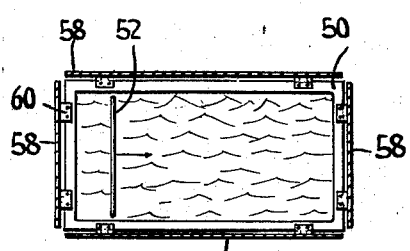
Figure 7 is a top plan view taken along the lines 7—7 of Figure 3 of an element of the apparatus used in connection with the present invention showing an important step in the process embodied in my present invention.

It was formerly necessary to subject the plastic sheeting to an additional bath 64 (shown in dashed lines in Fig. 3) or a second spraying with distilled water immediately following the first rinsing. However, the substitution of morpholine for diethyl aminoethanol as a stabilizer for the dye bath eliminates the requirement for using a second spraying operation or a soaking operation.

Immediately following the cessation of the dyeing operation by application of the water spray to the surfaces of the dyed plastic sheets, the surfaces of the sheets are air dried by blowing air from a fan 66 directed at a small angle to the surfaces of the plastic in order to remove any water droplets remaining on the plastic surfaces. This air drying is continued for about 10 minutes. When the opposing lateral edges are desired to be dip stained, the air dried sheets which have been partially dyed in their lower portions only are suspended by supporting the frames from portions 23 while the upper portions of the sheets are dipped into the dye solution. After the fan drying, the sheets are inserted into an oven 68 maintained at a temperature of about 150° F. for about a half hour. This final oven heating evaporates any solvent and water that may remain after the fan blowing operation. The sheets are then removed from the oven and stacked prior to laminating to form safety glass laminations.

It is important to maintain the dye concentration in the dipping tank in order to develop a desired depth of color during a specified dipping time. A quick means of determining the concentration of dye in the bath involves the use of an electrophotometer. In this test procedure, one cubic centimeter of dye solution having a pH of 9.5 is accurately measured into a 100 ml. volumetric glass and diluted with a 50–50 volume ratio dioxane-water mixture also maintained at pH 9.5. The pH of the 1 cc. of dye solution is adjusted prior to the addition of the dioxane-water mixture by adding glacial acetic acid until the proper pH is obtained.

Diethylene dioxide reacts with polyvinyl butyral plastic to soften the plastic, thus lessening the tension imparted to the plastic in the stretching operation performed prior to dipping the plastic sheeting. The use of pure dioxane as a solvent results in too rapid a reaction between the dye and the plastic to be controlled by controlling the time of exposure of the plastic to the dye solution. In many instances it is desired to impart a dye pattern to the plastic wherein not only is the density of the dye desired to be controlled, but also a non-uniform pattern of the dye concentration or intensity of coloring is wanted. It has been found that the addition of water to diethylene dioxide retards the reaction of the latter with the plastic and enables greater control over the intensity of coloring and the pattern obtained by varying the time of exposure of different portions of the plastic sheeting to the dye bath to be attained. A 50–50 water-dioxane ratio has been found suitable for production purposes. Should the dioxane content exceed 60% by volume of the dioxane water mixture, the dyeing occurs too rapidly for the intensity of coloring to be effectively controlled.

The dip staining operation has been set up on the basis of a solution containing 0.25% by weight of dye, 1% of weight of morpholine stabilizer, 0.15% by weight of wetting agent and the balance a 50–50 volume ratio dioxane-water. It is important to hold the dioxane content of the dye bath at this value to maintain solubility of the dye and develop the degree of dye stain desired. The dyestuffs used in the dye bath are soluble in dioxane but are not soluble in water. Solubility of the dye decreases rapidly below 40% by volume of dioxane and it is imperative that the concentration of dioxane be under constant control.

During production of dip stain sheeting, dioxane is lost through evaporation from the solution surface, evaporation from the drag out film and the plastic sheet draining into the dye tank and absorption by the sheeting. The volume fraction of dioxane in the solution can be determined by a measurement of the specific gravity of the mixture and the temperature in degrees centigrade by means of the following formula $$S = (-0.10V^2 + 0.140V + 0.992)$$
$$+ \frac{19.3 - T}{11.5}(-0.0062V^2 + 0.015V + 0.0026)$$

where:

$S$ equals specific gravity
$T$ equals temperature in degrees centigrade
$V$ equals volume fraction of dioxane By substituting the specific gravity of the dye solution for $S$ and the temperature of the solution for $T$ in the above equation, the volume ratio of dioxane to water, $V$, is easily determined. A hydrometer is used to determine the specific gravity of the dye solution and a thermometer immersed in the solution is used for a reading of the dye solution temperature.

In use, the alkalinity of the dye solution increases due to introduction of sodium bicarbonate from the plastic sheeting being stained. Double washing of the sheets prior to staining decreases the rate at which soda is introduced, but occasionally an adjustment in pH of the dye bath is necessary. It has been the practice to adjust the pH to 9.5 by the addition of glacial acetic acid slowly and with agitation to the dye bath while noting the pH on a suitable meter. The maximum alkalinity at which the dye bath operates suitably is preferably not over pH 10. Periodic adjustment of the dye solution to pH 9.5 is therefore necessary.

The dye solution contains 0.15% by weight of a wetting agent of the character described such as sold under the trade names of Renex (non-ionic, polyoxyethylene esters of mixed fatty and resin acids) or Aerosol OT (dioctyl sodium sulfosuccinate) which is required to improve wetting of the plastic sheet and particularly drainage streaks. This concentration is approximately the minimum concentration of this particular wetting solution that must be added to the solution to provide a solution whose surface tension remains uniform despite a change in concentration of wetting agent. Below 0.10% by weight of Renex concentration, for example, the dye solution surface tension begins to vary considerably with a change in Renex concentration. A concentration of Renex above 0.20% by weight, while not harmful to the adhesion between the dyed plastic and the glass may be a source of spots on the dip stained sheeting through deposition of droplets of wetting agents. This condition is true only if a high concentration of wetting agents is added, or wetting agents which have settled are stirred into the bath. Therefore, it is not advisable to increase the concentration of wetting agents substantially above 0.20% by weight of the dye bath.

The temperature range for both the ambient and bath temperatures must be controlled within the limits of 72 and 78° F. and the variation between the dye bath temperature and the ambient room temperature limited to a minimum, preferably no greater than 5° F. to prevent convection currents in the dye bath which cause uneven dyeing of the plastic sheet. If the dye bath temperature is below 72° F., the rate of dyeing is reduced sufficiently to result in reject sheeting because of high light transmittance. At temperatures above 78° F., not only does the stain develop too rapidly for effective time control to be imposed, but dye solubility at the surface of the bath is decreased as a result of evaporation of dioxane. The separator dye shows up as spots of heavier dye concentration or uneven stained areas somewhat grainy in appearance on the stained sheet.

The plastic has been found to swell due to the action of dioxane solvent during the operation of dipping the plastic in the dye. If the tension imparted to the plastic is not sufficient to maintain a smooth, taut sheet during staining, streaks are formed. These streaks usually are vertical and uniform corresponding with the wave developed in the loose sheeting. The overall length of stretch both lengthwise and transversely of the sheet should be from 6 to 8%. The sheeting is preferably taken from the roll so that the lengthwise direction is in the direction of the roll.

While a particular operation has been described, it is

What is claimed is:

1. An improved method of coloring plastic sheeting comprising imparting a longitudinal and transverse stretch to provide from 6 to 8% increase in dimensions uniformly to a plastic polyvinyl butyral sheet, attaching the stretched sheet to a rigid frame of noncorrodible material, said frame having the desired contour of the colored sheet, trimming the attached sheet to conform to the shape of the frame, clearing the surface of a solution of a dyestuff in a mixture of dioxane and water containing between about 0.1% to 1.5% by weight of morpholine, dipping the frame and attached sheet in the dye solution maintained at a temperature between about 72° F. and 78° F., removing the frame and attached sheet from the dye solution, rinsing the stretched plastic sheet with water to cease the interaction between the dye and the plastic, and subsequently drying the surfaces of the dyed sheet, said mixture of dioxane and water having a volume ratio of dioxane and water between 40:60 and 60:40.

2. The method recited in claim 1 wherein the dye solution consists essentially of 0.1 to 0.2% by weight of non-ionic, soluble polyoxyethylene esters of mixed fatty and resin acids, 0.1 to 1.5% by weight of morpholine, 0.1 to 0.5% by weight of dyestuffs soluble in a mixture of water and diethylene dioxide and the balance the mixture of water and dioxane.

3. A dye solution for dip staining plastic sheeting comprising a dyestuff and from 0.1 to 1.5% by weight of morpholine in a water-dioxane solvent, said solvent having a volume ratio of dioxane and water between 40:60 and 60:40.

4. A dye solution according to claim 3 wherein the concentration of morpholine is 1% by weight.

5. A dye solution for dip staining plastic sheeting consisting essentially of 0.1 to 0.2% by weight of non-ionic, soluble polyoxyethylene esters of mixed fatty and resin acids, 0.1 to 1.5% by weight of morpholine, 0.1 to 0.5% by weight of dyestuffs and the balance a mixture of water and diethylene dioxide, the latter constituting at least 40% but not over 60% by volume of the mixture, said dyestuffs being soluble in said mixture of water and dioxane and dyeing directly acetate rayon.

6. A solvent for a dye comprising a mixture of 40 to 60% volume dioxane and 60 to 40% water and from 0.1 to 1.5% by weight of morpholine, said morpholine content being based upon the mixture of dioxane and water.

7. An improved method of coloring plastic sheeting comprising imparting a small amount of a longitudinal and transverse stretch uniformly to a plastic polyvinyl butyral sheet, attaching the stretched sheet to a rigid frame of noncorrodible material, said frame having the desired contour of the colored sheet, trimming the attached sheet to conform to the shape of the frame, dipping the frame having the sheet attached into a dye solution, removing the frame and attached sheet from the dye solution, rinsing the plastic sheet on the frame with water to cease the interaction between the dye and the plastic, and subsequently drying the surfaces of the dyed sheet.

8. An improved method of coloring plastic sheeting comprising imparting a small amount of a longitudinal and transverse stretch uniformly to a plastic polyvinyl butyral sheet, attaching the stretched sheet to a rigid frame of noncorrodible material, said frame having the desired contour of the colored sheet, trimming the stretched, attached sheet to conform to the shape of the frame, clearing the surface of a dye solution, dipping the frame and attached sheet into the dye solution, removing the frame and attached sheet therefrom at a relatively rapid rate, rinsing the plastic sheet on the frame with water to cease the interaction between the dye and the plastic, drying the surfaces of the partially dyed sheet on the frame, reversing the orientation of the sheet by rotating the vertical frame 180° about its horizontal axis, redipping the reversely oriented plastic sheet into the dye solution and subsequently removing, rerinsing and redrying the twice dipped plastic sheeting.

9. An improved method of coloring plastic sheeting comprising imparting a small amount of a longitudinal and transverse stretch uniformly to a plastic polyvinyl butyral sheet, attaching the stretched sheet to a rigid frame of noncorrodible material, said frame having the desired contour of the colored sheet, trimming the stretched, attached sheet to conform to the shape of the frame, clearing the surface of a dye solution, dipping the frame and attached sheet into the dye solution so that each increment of the sheet is exposed to the dye for a predetermined period, thereby imparting a predetermined intensity pattern to the plastic sheet, removing the frame and attached sheet from the dye solution, rinsing the frame and attached plastic sheet with water to cease the interaction between the dye and the plastic, and subsequently drying the surfaces of the patterned sheet.

References Cited in the file of this patent

UNITED STATES PATENTS

| | | |
|---|---|---|
| 1,923,243 | Ulrich | Aug. 22, 1933 |
| 2,278,888 | Lewis | Apr. 7, 1942 |
| 2,609,269 | Ryan | Sept. 2, 1952 |
| 2,657,970 | Rudick | Nov. 3, 1953 |